United States Patent

[11] 3,532,104

[72] Inventor Kenneth H. Hoen
2396 Orchard Lane, Littleton, Colorado 80120
[21] Appl. No. 700,210
[22] Filed Jan. 24, 1968
[45] Patented Oct. 6, 1970

[54] PRESSURE COMPENSATED FLOW CONTROL VALVE SYSTEM
11 Claims, 5 Drawing Figs.

[52] U.S. Cl. ............................................. 137/116,
91/446, 137/117, 137/503, 137/614.19, 138/46,
251/120, 251/276, 251/278
[51] Int. Cl. ..................................................... G05d 16/10,
F16k 31/14
[50] Field of Search .......................................... 137/115,
116, 116.3, 116.5, 117, 495, 503, 505.13, 613,
614.19; 138/43, 45, 46; 251/276, 278, 120;
91/446; 60/(Inq)

[56] References Cited
UNITED STATES PATENTS
| | | | |
|---|---|---|---|
| 618,484 | 1/1899 | Scott.................... | 251/276X |
| 2,791,229 | 5/1957 | Pasco.................... | 137/117 |
| 3,374,803 | 3/1968 | Leveque................. | 137/503 |
| 3,387,622 | 6/1968 | Weinstein............... | 137/495 |

FOREIGN PATENTS
| | | | |
|---|---|---|---|
| 618,611 | 2/1949 | Great Britain........... | 251/276 |
| 250,165 | 6/1948 | Switzerland............. | 137/117 |

Primary Examiner—William F. O'Dea
Assistant Examiner—David J. Zobkiw
Attorney—John E. Reilly

ABSTRACT: A pressure compensated flow control valve and a directional control valve are incorporated in a single unit to maintain constant speed and directional control of a reversible fluid motor. The flow control valve has a spool which is capable of automatically compensating for variations in pressure resulting from load variations to maintain substantially constant flow in either direction of flow through the fluid motor. Further, the flow control valve may incorporate a modified form of spool which operates as a means of variable flow control to compensate for reductions in volumetric efficiency by regulating the flow capacity of fluid to the motor in response to variations in load imposed upon the motor.

Patented Oct. 6, 1970

3,532,104

INVENTOR
KENNETH H. HOEN
BY John E. Reilly
ATTORNEY

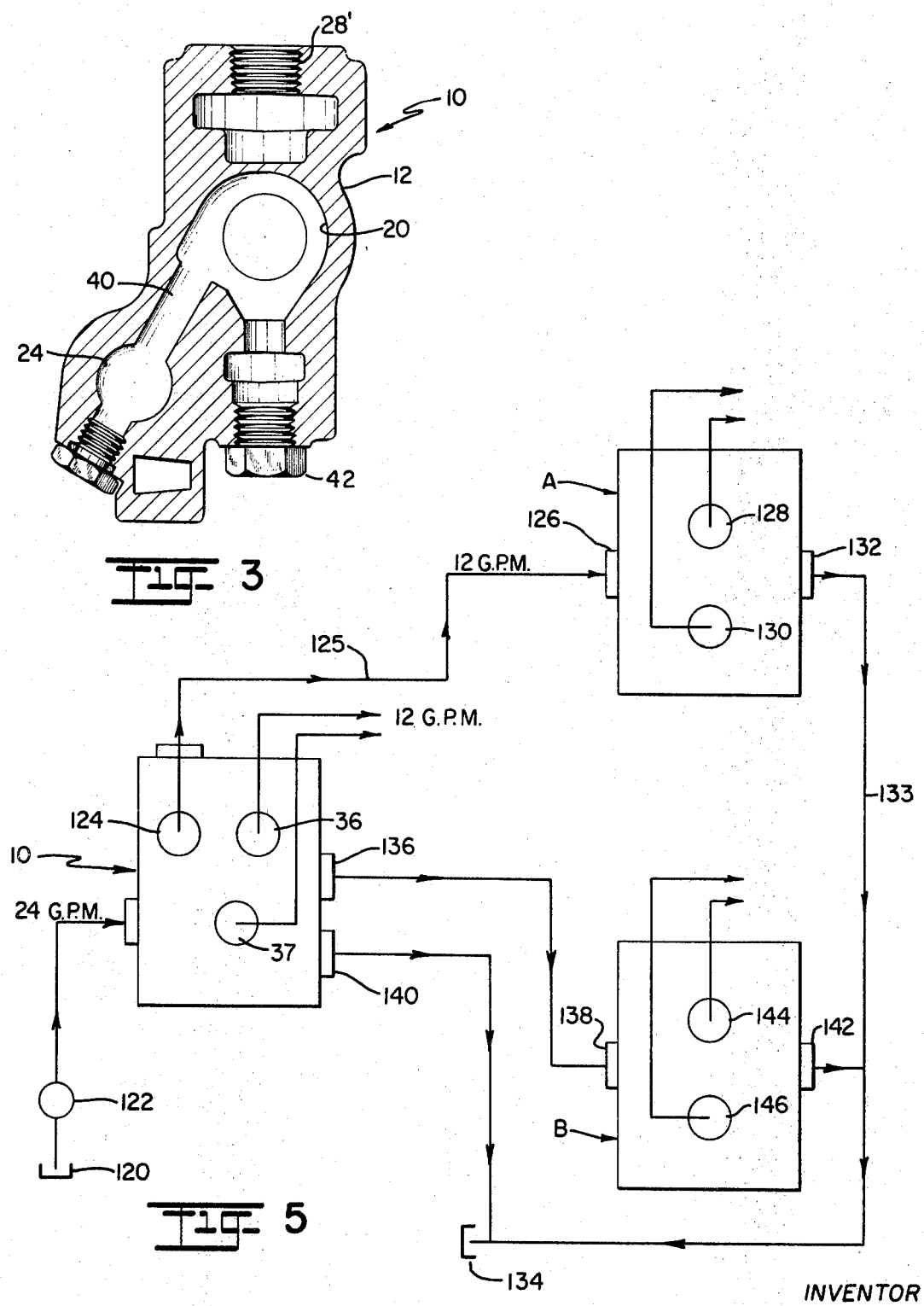

PRESSURE COMPENSATED FLOW CONTROL VALVE SYSTEM

This invention generally relates to automatic flow control valves for fluid actuated motors, and more particularly relates to novel and improved forms of flow control valves cooperating with a directional control valve to control the operation of fluid operated motors, cylinders and the like.

In the operation of reversible fluid motors, it is desirable to establish close, automatic control over the rate of fluid delivery to the motor in either direction of motor movement; for instance, to maintain constant flow to the motor notwithstanding load variations, or to effect controlled changes in the rate of fluid flow to the motor in order to compensate for reductions in volumetric efficiency. In accomplishing the above, it is further desirable to devise a means of control which is accurately and closely adjustable over a wide operating range, is conformable for use either as a flow divider or priority valve, and further may be used in operating two or more separate motor systems from a single fixed displacement pump.

It is therefore an object of the present invention to provide for novel and improved means to regulate the rate of fluid delivery to a fluid operated motor, and more specifically to provide a flow control valve which together with a directional control valve is incorporated within a single valve unit for regulating fluid flow to a reversible, fluid operated motor while permitting infinite adjustment of flow capacity over a wide operating range.

It is a further object of the present invention to provide a valve unit of the type described which may effectively operate as a means of flow control between a fixed displacement pump and one or more motors when arranged either in series or in parallel; and further, wherein alternate forms of flow control means are readily interchangeable either for the purpose of maintaining constant fluid flow, notwithstanding load variations, or to effect controlled changes in the rate of fluid flow in order to compensate for reductions in volumetric efficiency in the motor.

In accordance with the present invention, a constant flow control valve has a valve element disposed in the path of flow from a source of fluid pressure to the pressure side of a directional control valve, and the valve element is manually adjustable to a selected flow setting. A floating spool in the valve is independently responsive to variations in back pressure in the motor to impose a correction on fluid pressure which will maintain a constant rate of flow to the motor in either direction of movement. Thus, the back pressure of the motor, being a function of the load imposed upon the motor, can be utilized as a means of sensing load variations and of regulating fluid pressure from the valve to maintain a substantially constant flow condition. Specifically, fluid pressure is modulated in response to back pressure by disposing the floating spool between the pressure and exhaust sides of a directional control valve, the pressure and exhaust being in direct communication with supply pressure so that a change in back pressure resulting in a change in pressure between the pressure and exhaust side of the directional control valve will be compensated for by advancing the floating spool in a direction to vary the relative opening sizes between the pressure and exhaust ports whereby to re-establish a balanced pressure and maintain a substantially constant flow from the source of fluid pressure to the motor.

A modified form of valve member is readily interchangeable with the constant flow control valve member and is further automatically adjustable in response to load variations to impose a corresponding change in the rate of fluid flow to the motor in a unique, highly simplified manner. Essentially, the modified form of valve is designed to compensate for reductions in volumetric efficiency resulting from increases in motor load.

Furthermore, a plurality of valve units, each for a separate motor system, may be arranged either in series or in parallel to direct flow from a common fixed displacement pump to each of the motor systems, each unit being independently adjustable to establish a predetermined rate of flow to its motor and being automatically controllable in response to variations in back pressure to maintain a constant flow.

The above and other objects and advantages and features of the present invention will become more readily appreciated and understood from a consideration of alternate forms of the present invention when taken together with the accompanying drawings, in which:

FIG. 3 is a sectional view taken about line 3-3 of FIG. 1.

FIG. 5 is a somewhat schematic view of a series-parallel connection between a plurality of valve units in accordance with the present invention.

Figure 1:
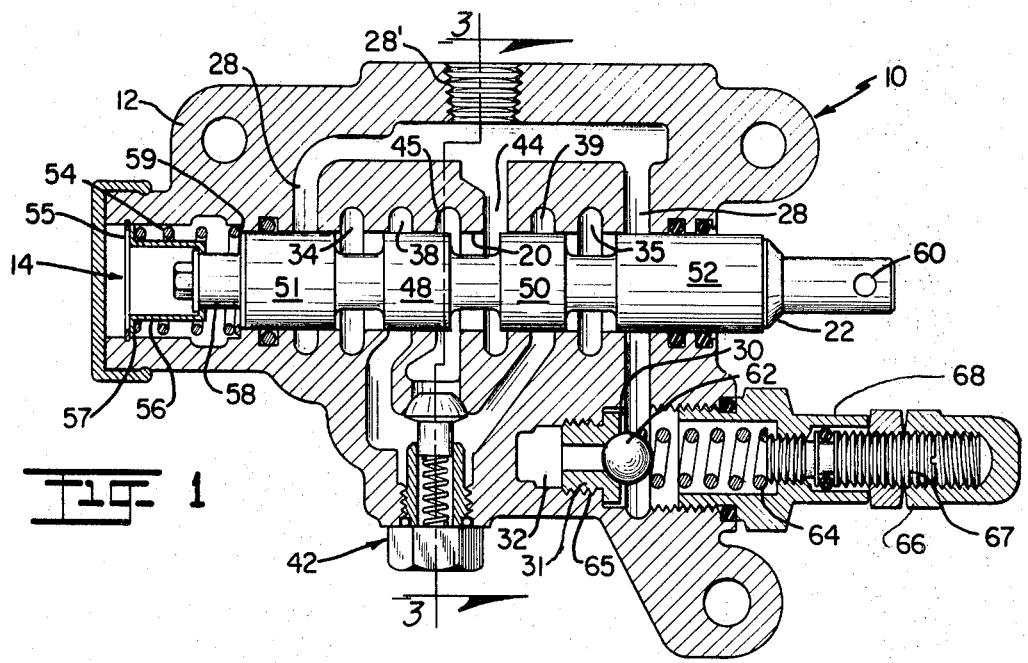
FIG. 1 is a sectional view of one form of valve unit of the present invention specifically illustrating the directional control valve.
Figure 2:
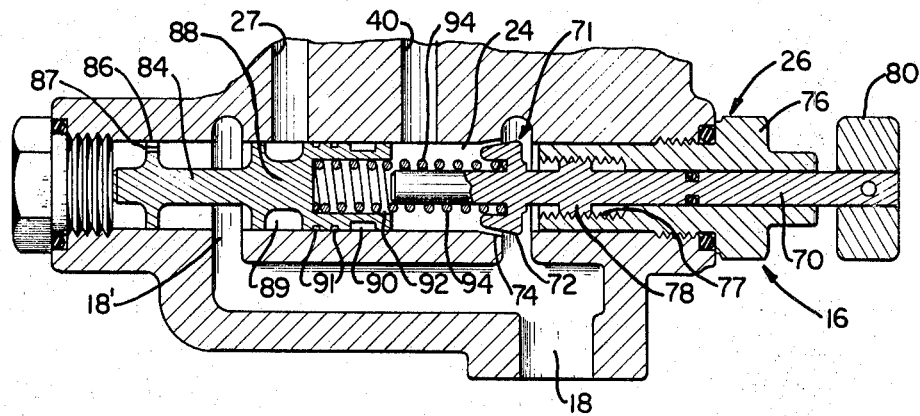
FIG. 2 is a fragmentary sectional view of the flow control valve of the valve unit shown in FIG. 1.

Referring in more detail to the drawings, there is illustrated in FIGS. 1 to 3 a valve unit 10 which consists of a common valve housing 12 for a directional control valve 14 and a flow control valve 16. Essentially the flow control valve 16 controls fluid flow from inlet 18, connected to a source of fluid pressure, not shown; and in turn the directional control valve 14 controls the supply and direction of flow between the flow control valve and a reversible fluid motor, not shown. For the purpose of illustration the fluid motor may suitably be a hydraulic motor, pump, double acting hydraulic cylinder or other hydraulically operated motion device in which the back pressure is a function of the load imposed upon the device.

In the directional control valve, the main bore 20 receives a spool 22, and in the flow control valve the flow control bore 24 receives a spool assembly 26. Communicating with opposite ends of the main bore 20 is a common groove 28 which at one end exhausts fluid through an exhaust port or groove 27 at one end of the flow control bore 24 and at the opposite end intersects a bore 30 for a pressure relief valve 31. One end of the bore 30 has a port 32 receiving fluid under pressure from the inlet 18. A pair of grooves 34 and 35 extend from the directional control bore 20 for communication with pressure and return sides of cylinder ports 36 and 37, respectively, the latter being illustrated in FIG. 5; and grooves 38 and 39 are each connected to pressure or supply port 40 from the flow control valve to direct fluid pressure to the motor through one of grooves 34 or 35. A load check valve 42 is seated in the passageway between the port 40 and grooves 38 and 39, and grooves 44 and 45 serve in cooperation with the valve 42 to permit the supply pressure to go to exhaust when reversing the direction of flow through the valve.

In order to control the supply and direction of fluid flow to the motor, the spool 22 is provided with spaced intermediate lands 48 and 50 being slidable to control fluid flow between the grooves in a manner to be described; also, lands 51 and 52 are slidable in sealed relation through opposite ends of the bore 20. The spool 22 is normally centered within the bore 20 by a compression spring 54 interposed between a stop 55 and the land 51, the spring being further arranged in surrounding relation to a sleeve 56, including a collar 57, and a reduced extension 58 of the end portion 51. Movement of the spool is suitably controlled by a lever, not shown, inserted in an opening 60 in the opposite, extreme end of the spool. When the spool is advanced to the left, as viewed in FIG. 1, the extension is moved through the sleeve 56 until the land 51 abuts the end of the sleeve 56; and when advanced to the right, the extension 58 carries the sleeve 56 until the collar 57 abuts a shoulder 59 at the end of the bore 22.

When the spool is advanced to the right from its normally centered disposition as shown in the drawing, communication is established between grooves 38 and 34 whereby to apply fluid under pressure from the pressure port 40 through cylinder port 36. In addition, communication is established between groove 35 and groove 28 to exhaust fluid from the cylinder port 37 to exhaust port 27. In addition, fluid flow is interrupted between grooves 39 and 44. To reverse the direction of fluid flow the spool is advanced in the opposite direction to the left to establish communication from pressure port 40 through grooves 39 and 35 to the cylinder port 37, and to establish communication at the opposite end between the groove 34 and exhaust port 27. In advancing between positions, it will be noted that communication is temporarily established between the cross-over ports 44 and 45 to permit the supply to go to exhaust.

The pressure relief valve 31 includes a valve element 62 normally closed under the urging of spring 64 against supply pressure applied through port 32 and the hollow valve seat 65. Conventionally, the relief valve may include a manual adjustment member 66 being threaded on a stem 67 to control the extent of projection of the stem 67 through a sleeve 68 in urging the end of the spring 64 against the valve element 62. The valve is preset to open at a predetermined pressure level so that excess fluid pressure is admitted into the bore 30 for exhaust through grooves 28 and 27, respectively.

In the flow control valve, the spool assembly 26 includes an elongated stem 70 having a valve element 71 provided with a tapered external surface 72 disposed across a valve seat 74 between the inlet 18 and the supply port 40, the flow setting of the valve of course being determined by the opening size established between the valve element 72 and the valve seat 74. In order to position the valve element in desired relation to the valve seat, the stem 70 is mounted in a stationary sleeve 76 at one end of the bore, the sleeve having an internally threaded recess 77 to mate with an externally threaded portion 78 on the stem. Turning of the manual adjustment control knob 80 will threadedly advance the stem in relation to the sleeve whereby to position the valve element 71 in desired relation to the valve seat 74.

A floating spool 84 defines a continuation of the stem 70 for selective movement between the supply port 40 and a groove 18' communicating with the inlet 18. The floating spool 84 is provided with a fluid dampener 86 at one end including an orifice 87, and a land 88 is provided with relatively wide grooves 89 and 90 and relatively narrow intermediate grooves 91 on its external surface. A cylindrical recess 92 is formed in one end of the spool in facing relation to the stem for the purpose of receiving a coiled compression spring 94 disposed in surrounding relation to the leading end of the stem 70, and the spring 94 normally biases the land 88 to a position as shown in which the pressure port 40 is fully open and fluid flow is blocked between the inlet groove 18' and the exhaust port 27.

The spool portion or land 88 is movable between the pressure and exhaust ports 40 and 27 to maintain a constant pressure differential notwithstanding variations in supply pressure or in back pressure in the motor and thereby maintaining a substantially constant flow through the pressure port 40 in either direction of rotation of the fluid motor. For instance, under an increase in supply pressure the spool portion 88 is advanced in a direction away from the inlet groove 18' and toward the pressure port 40 whereby to open the exhaust port 27 to supply pressure from the inlet 18 to the extent necessary to compensate for the increase in supply pressure and until the constant pressure differential is re-established on the opposite sides of the spool portion. If the back pressure increases, it will act through the supply port against the spool portion 88 to advance the spool in a direction reducing the opening size to the exhaust port 27 and increasing the pressure port opening resulting in an increase in supply pressure.

If the exhaust pressure is reduced, again the spool is moved in a direction to restrict flow of supply pressure through the exhaust port 27 and to increase supply pressure through the pressure port. Accordingly where variations in load cause either a change in back pressure on the pressure side of the directional control valve or a change in exhaust pressure at the exhaust side, resulting in a change in pressure differential on opposite sides of the spool portion 88, the spool is advanced in a direction compensating for the change and maintaining a constant pressure condition. By re-establishing this constant pressure condition on opposite sides of the spool portion a substantially constant flow can be held from the source of fluid pressure into the directional control valve.

It will be apparent that virtually the same result may be achieved in the absence of the exhaust port 27 merely by having the supply pressure act on opposite sides of the spool portion 88 to control the opening size of the pressure port 40 and consequently the pressure to the directional control valve. For example, in the absence of the exhaust port 27, it will be seen that an increase in supply pressure would act against the end of the spool portion opposite the pressure port to force the spool portion in a direction reducing the size of the pressure port 40 until a pressure balance is reached on opposite sides of the spool. Similarly an increase in back pressure will increase the pressure on the side of the spool portion nearest the pressure port 40 to advance the spool in a direction increasing the opening size of the pressure port to overcome the increase in back pressure and re-establish a constant pressure. In this way, the exhaust port may be omitted or blocked, and a separate port or groove, such as, a port 28' formed in the valve housing in communication with the exhaust groove 28 in the directional control valve for connection into one or more additional valve units in a manner to be described with reference to FIG. 5.

Figure 4:
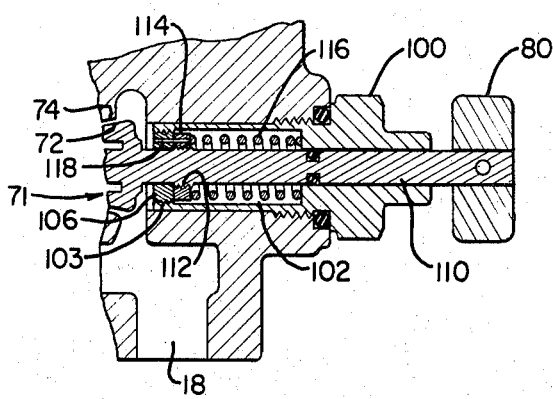
FIG. 4 is a fragmentary section of a modified form of flow control valve.

A modified form of flow control valve is illustrated in FIG. 4 which is designed to compensate for reductions in volumetric efficiency in the motor by selectively but automatically increasing the opening size and rate of flow from the inlet 18 through the pressure port 40. Like parts are correspondingly enumerated and, as in the form of invention shown in FIGS. 1 to 3, the spool assembly is provided with a valve element 72 disposed across the valve seat 74 in the bore 24 between the inlet 18 and pressure port or groove 40. However a modified form of sleeve 100 is fixed within one end of the bore and has a hollow cylindrical recess 102 arranged in facing relation to the valve element 72, the recess 102 being internally threaded at 103 for engagement with an externally threaded ring 106. A stem 110 is inserted through the sleeve and has an externally threaded surface portion 112 which receives a nut 114 urged against the inside of the ring 106 by a compression spring 116. One or more guide pins 118 are inserted through aligned openings in the nut 112 and ring 106 so that the ring and nut elements are keyed together for rotation, while the nut is free to advance in a direction away from the ring against the urging of the spring 116.

In the manner described with reference to FIG. 2, the initial setting of the valve element 72 is controlled by the manual adjustment control knob 80 which will simultaneously turn the nut 114 and ring 106, the latter being threadedly advanced along the internally threaded portion 103 of the sleeve either in a direction to increase or reduce the opening between the valve element and seat 74. The spring constant of the spring element 116 may be determined by the known volumetric efficiency of the motor to compensate for known reductions in volumetric efficiency resulting from leakage in the motor under given increases in back pressure. Thus as the back pressure increases it will act rearwardly against the valve element 72 thereby causing the nut 114 to slide rearwardly against the urging of the spring 116 away from the ring member 106 to increase the valve opening size and increase flow from the inlet through the pressure port 40 overcoming the fluid loss resulting from leakage in the motor. The spool extension 84 will operate as described to maintain a constant pressure condition, notwithstanding variations in flow through the pressure port necessary to compensate for reductions in volumetric efficiency, and in this way permit the motor to operate extremely close to its rated capacity irregardless of variations in load.

In FIG. 5 the valve unit 10 of FIGS. 1 to 3 is shown connected in parallel to a standard valve A and being connected in series to a standard valve unit B. For the purpose of illustration, 24 gallons per minute may be available from a source of fluid pressure 120 through a fixed displacement pump 122, and the flow control valve may be set to deliver 12 gallons per minute through the outlet cylinder ports 36 and 37 to a fluid motor, not shown. The balance of fluid available is removed through a port 124 from the supply inlet 18 for delivery over line 125 to the inlet port 126 of valve A. Suitably, the valve A may correspond to the valve unit 10 or may be a standard directional control valve having cylinder ports 128 and 130 to deliver fluid to a fluid motor, not shown. An exhaust port 132 is provided to return fluid over line 133 to a tank or reservoir 134.

Additionally, the valve unit 10 is provided with a "power beyond" sleeve 136 communicating with the pressure side of the directional control valve to apply fluid under pressure to the inlet 138 of valve B, and an exhaust port 140 communicates with the exhaust side of the directional control valve, as does the exhaust port 142, for return of fluid to the tank 134. Again cylinder ports 144 and 146 are provided in valve B to deliver fluid to a motor or other device to be hydraulically operated by the valve. In the relationship shown, either valves 10 and A may be operated simultaneously or valves 10 and B may be operated simultaneously and each may be independently regulated by an adjustable flow knob to control flow to its fluid motor between zero and 12 gallons per minute. Of course the proportionate flow to each valve may be varied depending upon speed and load requirements of each motor. If the valve unit 10 is used independently its flow can be regulated between zero and 24 gallons per minute again by adjustment of the control knob 80.

When the valve unit 10 and valve B are used simultaneously the divided flow into valve B can be varied according to the adjusted flow setting on valve 10; or when the valve 10 is not in use the valve B will receive the full amount of flow through valve 10 and can be regulated independently to the desired flow setting.

It will be appreciated that the valve unit of the present invention incorporates within a single compact housing a directional control valve combined with an infinitely variable, manually adjustable, pressure compensated flow control valve and a built-in main line pressure relief valve. Fluid flow can be held at a constant volume rate regardless of supply or back pressure variations, and output volume is infinitely adjustable from zero to the maximum rated volume of the pump quickly and easily under all operating conditions. The valve unit may be utilized either as a flow divider or priority valve and enables operation of two or more separate systems from a single fixed displacement pump. Further the flow control valve is capable of maintaining a constant flow, or in the modified form is capable of modulating flow independently of the direction of fluid flow from the directional control valve to the fluid motor. Thus the single control valve functions in both directions of fluid flow with a single control to maintain the desired flow setting.

Accordingly it will be seen that a very simple and highly effective flow control valve system has been devised which will fully accomplish the desired objectives set forth herein. It is therefore to be understood that while alternate forms of valve units have been set forth and described various other modifications and changes may be made without departing from the spirit.

I claim:

1. In a fluid flow control system for driving a reversible fluid motor subject to variable load conditions, the back pressure of the motor being a function of the load, said system having a directional control valve to determine the direction of fluid flow from a source of fluid under pressure through fluid pressure and exhaust ports to the fluid motor, the combination therewith of a flow control valve including a valve means disposed in a flow control bore in the path of flow from the fluid supply source to the fluid pressure port, a valve seat disposed in the bore between the fluid supply source and the fluid pressure port, said valve means including a valve element movable into predetermined relation to the valve seat to establish the rate of fluid flow from the fluid supply source through the fluid pressure port to the directional control valve, said valve means further including a pressure balancing member slidably disposed in sealed relation within the bore and responsive on one side to fluid pressure in the flow control bore between said valve element and the fluid pressure port and on the opposite side to fluid pressure from the fluid supply source through a fluid supply groove communicating with the flow control bore on the side of the pressure balancing member opposite the fluid pressure port, resilient means between said valve element and said pressure balancing member normally positioning said pressure balancing member in predetermined relation to the fluid pressure port, and said pressure balancing member movable in response to variations in supply pressure and in back pressure to vary the size of the fluid pressure port in order to maintain substantially constant fluid flow through the fluid pressure port.

2. In a fluid flow control system according to claim 1 in which the exhaust port from the directional control valve communicates with the flow control bore between the fluid pressure port and the fluid supply groove, said pressure balancing member further movable in response to changes in pressure differential between the fluid supply source and the fluid pressure port to selectively control fluid flow from the fluid supply source into the exhaust port in maintaining a balanced pressure condition and substantially constant flow to the directional control valve.

3. In a fluid flow control system according to claim 2, said pressure balancing member being provided with balancing grooves on its external surface between the fluid pressure port and the fluid exhaust port, and a fluid dampener defining a coaxial extension of said pressure balancing member in the flow control bore.

4. In a fluid flow control system according to claim 1, said valve means further including a sleeve fixed in the flow control bore, an axial extension of said valve element including means to adjustably position said axial extension within the sleeve to determine the flow setting between said valve element and said valve seat, said positioning means including a biasing member yieldingly urging the axial extension toward the predetermined setting, and said biasing member yielding under increases in pressure in the fluid pressure port above a predetermined pressure level to permit movement of said valve element in a direction increasing the rate of flow through said fluid pressure port.

5. In a fluid flow control system according to claim 4, said positioning means between said sleeve and said axial extension comprising an adjustable stop member on said sleeve threadedly engaging the internally threaded surface of a recess within said sleeve, a nut threaded on said axial extension behind said adjustable stop member, said nut being keyed for rotation with said stop member while being axially movable independently of said stop member, and said biasing member being defined by a spring disposed in the recess behind said nut to yieldingly urge said nut against said adjustable stop member.

6. In a fluid flow control system according to claim 5, said positioning means further including manual adjustment control means on said axial extension for threadedly adjusting said adjustable stop member with respect to said sleeve whereby to determine the initial flow setting between said valve element and said valve seat.

7. A flow control valve comprising a valve seat disposed in a flow control bore in the path of flow from a fluid pressure inlet to a fluid pressure port; a valve spool assembly in the flow control bore downstream of said seat a valve element movable into predetermined relation to said valve seat normally to establish a constant rate of flow from the fluid pressure inlet into the fluid pressure port, a first biasing member interposed between said valve spool assembly and said valve element, an axial extension of said valve element including positioning means adjustably positioning said axial extension within the bore to determine the flow setting between said valve element and said valve seat, said positioning means including a second biasing member yieldingly urging the axial extension toward the predetermined setting, and said second biasing member yielding under increases in pressure in the fluid pressure port above a predetermined pressure level to permit movement of said valve element in a direction increasing the rate of flow through said fluid pressure port.

8. A flow control valve according to claim 7, said positioning means being defined by a sleeve fixed within the bore, an adjustable stop member on said sleeve threadedly engaging an internally threaded surface in a recess on said sleeve, a threaded member on said axial extension behind said adjustable stop member, said threaded member keyed for rotation with said adjustable stop member while being axially movable independently of said adjustable stop member, and said second biasing member being defined by a spring disposed in the recess behind said threaded member to yieldingly urge said threaded member against said adjustable stop.

9. A flow control valve according to claim 8, said positioning means further including a manual adjustment control member on said axial extension for threadedly adjusting said adjustable stop member with respect to said sleeve whereby to determine the initial flow setting between said valve element and said valve seat.

10. A fluid flow control valve unit comprising a valve seat disposed in a flow control bore in the path of flow from a fluid pressure supply source to a fluid pressure port; and a valve spool assembly in the flow control bore including a valve element being movable into predetermined relation to the valve seat to establish the rate of fluid flow from the fluid supply source through the fluid pressure port, a pressure balancing member being slidably disposed in sealed relation within the bore and being responsive on one side to fluid pressure in the flow control bore between said valve element and the fluid pressure port and on the opposite side to fluid pressure from the fluid supply source through a fluid supply groove communicating with the flow control bore on the side of the pressure balancing member opposite the fluid pressure port, resilient biasing means normally positioning said pressure balancing member in predetermined relation to the fluid pressure port for a given flow setting between said valve element and said valve seat, and said pressure balancing member being movable to compensate for variations in pressure on opposite sides thereof in regulating the size of the fluid pressure port to maintain substantially constant fluid flow from the fluid supply source through the fluid pressure port.

11. A fluid flow control valve unit according to claim 10, said pressure balancing member including balancing grooves on its external surface portion, and a fluid dampener defining an axial continuation of said pressure balancing member.